United States Patent
Fukuhara et al.

(10) Patent No.: US 9,650,455 B2
(45) Date of Patent: *May 16, 2017

(54) DISPERSION STABILIZER FOR SUSPENSION POLYMERIZATION AND METHOD FOR PRODUCING VINYL RESIN

(71) Applicant: KURARAY CO., LTD., Kurashiki-shi (JP)

(72) Inventors: Tadahito Fukuhara, Okayama (JP); Yosuke Kumaki, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/910,582

(22) PCT Filed: Aug. 6, 2014

(86) PCT No.: PCT/JP2014/004113
§ 371 (c)(1),
(2) Date: Feb. 5, 2016

(87) PCT Pub. No.: WO2015/019613
PCT Pub. Date: Feb. 12, 2015

(65) Prior Publication Data
US 2016/0194416 A1   Jul. 7, 2016

(30) Foreign Application Priority Data
Aug. 7, 2013 (JP) .................... 2013-164604

(51) Int. Cl.
| C08F 116/06 | (2006.01) |
| C08F 2/20 | (2006.01) |
| C08F 8/12 | (2006.01) |
| C08F 2/30 | (2006.01) |
| C08F 216/06 | (2006.01) |
| C08F 218/08 | (2006.01) |

(52) U.S. Cl.
CPC .............. *C08F 116/06* (2013.01); *C08F 2/20* (2013.01); *C08F 2/30* (2013.01); *C08F 8/12* (2013.01); *C08F 216/06* (2013.01); *C08F 218/08* (2013.01); *C08L 2201/54* (2013.01)

(58) Field of Classification Search
CPC ........ C08F 116/06; C08F 2/20; C08F 114/06; C08F 2500/02; C08L 29/04; C08L 2201/54
See application file for complete search history.

(56) References Cited

U.S. PATENT DOCUMENTS

| 5,349,008 A | 9/1994 | Takada et al. |
| 2004/0152834 A1* | 8/2004 | Kato .................. C08F 2/20 525/62 |

FOREIGN PATENT DOCUMENTS

| EP | 2 154 161 A1 | 2/2010 |
| JP | 54-025990 A | 2/1979 |
| JP | 54025990 | * 2/1979 |
| JP | 55-137105 A | 10/1980 |
| JP | 56055403 | * 5/1981 |
| JP | 57-028121 A | 2/1982 |
| JP | 57-105410 A | 6/1982 |
| JP | 59-166505 A | 9/1984 |
| JP | 01-095103 A | 4/1989 |
| JP | 06-080710 A | 3/1994 |
| JP | 09-183805 A | 7/1997 |
| JP | 10-259213 A | 9/1998 |
| JP | 2002-069105 A | 3/2002 |
| JP | 2007-070531 A | 3/2007 |
| WO | 91/15518 A1 | 10/1991 |

OTHER PUBLICATIONS

JP 54-025990 (Machine Translation of Abstract) & JP 56-055403 (Machine Translation of Abstract).*
Scifinder Summary of JP 54-025990.*
International Search Report Issued Oct. 21, 2014, in PCT/JP2014/004113 Filed Aug. 6, 2014.
Extended European Search Report issued Feb. 14, 2017 in corr. European Patent Application No. 14834923.6 filed Aug. 6, 2014.

* cited by examiner

*Primary Examiner* — Mark Kaucher
(74) *Attorney, Agent, or Firm* — Oblon, McClelland, Maier & Neustadt, L.L.P.

(57) ABSTRACT

The present invention provides a highly water-soluble and easy-to-handle dispersion stabilizer for suspension polymerization that meets the following requirements: even if the amount of the dispersion stabilizer for suspension polymerization used for suspension polymerization of a vinyl compound is small, the resulting vinyl resin has high plasticizer absorptivity and is easy to work with; it is easy to remove residual monomer components from the resulting vinyl resin; and the resulting vinyl resin contains fewer coarse particles. The present invention relates to a dispersion stabilizer for suspension polymerization of a vinyl compound. This dispersion stabilizer contains a vinyl alcohol polymer (A) having a degree of saponification of 20 mol % or more and less than 65 mol %, a viscosity average degree of polymerization (P) of 100 or more and less than 600, an aliphatic hydrocarbon group having 6 to 18 carbon atoms at its terminal, and an anionic group in its side chain.

6 Claims, No Drawings

DISPERSION STABILIZER FOR SUSPENSION POLYMERIZATION AND METHOD FOR PRODUCING VINYL RESIN

TECHNICAL FIELD

The present invention relates to a dispersion stabilizer for suspension polymerization of a vinyl compound. The present invention also relates to a method for producing a vinyl resin in which suspension polymerization of a vinyl compound is conducted in the presence of the dispersion stabilizer for suspension polymerization.

BACKGROUND ART

Conventionally, suspension polymerization of vinyl compounds (for example, vinyl chloride) has been conducted to obtain vinyl resins from the vinyl compounds. It has been known to use a partially saponified vinyl alcohol polymer (hereinafter, a vinyl alcohol polymer is sometimes abbreviated as "PVA") as a dispersion stabilizer for suspension polymerization of vinyl compounds.

The requirements for a dispersion stabilizer for suspension polymerization of vinyl compounds include: (1) even if the amount of the dispersion stabilizer for suspension polymerization used is small, the resulting vinyl resin has high plasticizer absorptivity and is easy to work with; (2) it is easy to remove residual monomer components from the resulting vinyl resin; (3) the resulting vinyl resin contains fewer coarse particles; and (4) the dispersion stabilizer for suspension polymerization has high water solubility and thus good handleability.

Demand for dispersion stabilizers that are more effective in meeting these requirements (1) to (4) is increasing more and more. In particular, the level of the above requirement (2) for easy removal of monomer components is very high, for example, in the production of hard polyvinyl chloride in which polymerization is conducted at a temperature of 60° C. or higher. Specifically, in the production of hard polyvinyl chloride at a polymerization temperature of 60° C. or higher, it is generally more difficult to remove residual vinyl chloride monomers in polyvinyl chloride particles in the drying step after the completion of polymerization, than in the production of hard polyvinyl chloride at a polymerization temperature lower than 60° C., and thus in the former case, drying needs to be carried out under more severe conditions or for a longer time to remove residual monomers. Therefore, there is a strong need for energy reduction and time reduction in the step of removing residual monomers, and thus there is a demand for a dispersion stabilizer that allows more residual monomers to be removed in a shorter time.

Even if a traditionally-used common partially saponified PVA is used as a dispersion stabilizer for suspension polymerization to respond to these increasing demands for more effective stabilizers, it is rather difficult for such a common PVA to fully meet these enhanced requirements.

Patent Literatures 1 and 2 each disclose a method for making a partially saponified PVA more effective as a dispersion stabilizer for suspension polymerization and propose the use of a PVA having a terminal alkyl group for suspension polymerization of a vinyl compound. However, in this method, if the degree of saponification and degree of polymerization of the PVA are low, the PVA is insoluble in water and cannot meet the requirement (4), although it is effective to some extent in meeting the above requirements (1) and (2). The water solubility is improved by increasing the degree of saponification, but the requirements (1) and (2) cannot be met instead. In view of this, Patent Literatures 3 and 4 each propose a method of using, as a dispersion stabilizer for suspension polymerization of a vinyl compound, a PVA obtained by introducing an oxyalkylene group into a PVA having a low degree of saponification and a low degree of polymerization to impart water solubility to the PVA. However, with respect to the requirements (1) to (4), this is not necessarily a good way to obtain satisfactory results. Furthermore, Patent Literatures 5 to 7 each propose a method of using, as a dispersion stabilizer for suspension polymerization of a vinyl compound, a PVA having an ionic group in its side chain. However, with respect to the requirements (1) to (3), this is also not necessarily a good way to obtain satisfactory results, although improvement is seen in the effect on the requirement (4).

Thus, it can be said that no dispersion stabilizer for suspension polymerization of vinyl compounds that fully meet these enhanced requirements (1) to (4) has been found up to now. Nor can various PVA-based dispersion stabilizers for suspension polymerization disclosed in Patent Literatures 1 to 7 fully meet these requirements.

CITATION LIST

Patent Literature

Patent Literature 1: JP 59(1984)-166505 A
Patent Literature 2: JP 54(1979)-025990 A
Patent Literature 3: JP 10(1998)-259213 A
Patent Literature 4: JP 2002-069105 A
Patent Literature 5: JP 2007-070531 A
Patent Literature 6: JP 01(1989)-95103 A
Patent Literature 7: JP 06(1994)-80710 A

SUMMARY OF INVENTION

Technical Problem

It is an objective of the present invention to provide a highly water-soluble and easy-to-handle dispersion stabilizer for suspension polymerization that meets the following requirements; even if the amount of the dispersion stabilizer for suspension polymerization used for suspension polymerization of a vinyl compound is small, the resulting vinyl resin has high plasticizer absorptivity and is easy to work with; it is easy to remove residual monomer components from the resulting vinyl resin; and the resulting vinyl resin contains fewer coarse particles.

Solution to Problem

The present inventors have found that the objective of the present invention is accomplished by using, as a dispersion stabilizer for suspension polymerization of a vinyl compound, a vinyl alcohol polymer having a degree of saponification of 20 mol % or more and less than 65 mol %, a viscosity average degree of polymerization (P) of 100 or more and less than 600, an aliphatic hydrocarbon group having 6 to 18 carbon atoms at its terminal, and an anionic group in its side chain, and thus completed the present invention.

Specifically, the present invention relates to:
[1] a dispersion stabilizer for suspension polymerization of a vinyl compound, containing a vinyl alcohol polymer (A) having a degree of saponification of 20 mol % or more and less than 65 mol %, a viscosity average degree of polymerization (P) of 100 or more and less than 600, an aliphatic hydrocarbon group having 6 to 18 carbon atoms at its terminal, and an anionic group in its side chain;
[2] the dispersion stabilizer for suspension polymerization as defined in the above [1], wherein a relationship between the viscosity average degree of polymerization (P) of the vinyl alcohol polymer (A) and a degree of modification (S) (mol %) of the aliphatic hydrocarbon group satisfies the following formula (1):

$$50 \leq S \times P/1.880 < 100 \quad (1);$$

[3] the dispersion stabilizer for suspension polymerization as defined in the above [1] or [2], wherein in sequences of vinyl ester monomer units and/or vinyl alcohol units of the vinyl alcohol polymer (A), a block character of the vinyl ester monomer units is 0.6 or less;

[4] the dispersion stabilizer for suspension polymerization as defined in any one of the above [1] to [3], further containing a vinyl alcohol polymer (B) having a degree of saponification of 65 mol % or more and a viscosity average degree of polymerization of 600 or more;

[5] the dispersion stabilizer for suspension polymerization as defined in the above [4], wherein a mass ratio between the vinyl alcohol polymer (A) and the vinyl alcohol polymer (B) ([vinyl alcohol polymer (A)]/[vinyl alcohol polymer (B)]) is 10/90 to 55/45;

[6] a method for producing a vinyl resin, including a step of conducting suspension polymerization of a vinyl compound in the presence of the dispersion stabilizer for suspension polymerization as defined in any one of the above [1] to [5]; and

[7] the method as defined in the above [6], wherein the suspension polymerization is conducted in the presence of water, and a mass ratio between the vinyl compound and the water ([vinyl compound]/[water]) is more than 3/4.

Advantageous Effects of Invention

Since the dispersion stabilizer for suspension polymerization of the present invention has high water solubility and can be dissolved or dispersed in water without using any organic solvent such as methanol, it has good handleability. When suspension polymerization of a vinyl compound is conducted in the presence of the dispersion stabilizer for suspension polymerization of the present invention, fewer coarse particles are formed due to high polymerization stability, and the resulting vinyl resin particles have a uniform particle size. Furthermore, even if the amount of the dispersion stabilizer for suspension polymerization of the present invention used is small, the resulting vinyl resin particles have high plasticizer absorptivity and are easy to work with. In addition, the rate of removing residual vinyl compound components from vinyl resin particles per unit time is high, and the resulting vinyl resin particles have good monomer removability.

DESCRIPTION OF EMBODIMENTS

<Dispersion Stabilizer for Suspension Polymerization>

The dispersion stabilizer of the present invention for suspension polymerization of a vinyl compound contains a vinyl alcohol polymer (A) having a degree of saponification of 20 mol % or more and less than 65 mol %, a viscosity average degree of polymerization (P) of 100 or more and less than 600, an aliphatic hydrocarbon group having 6 to 18 carbon atoms at its terminal, and an anionic group in its side chain (in this description, the vinyl alcohol polymer (A) is sometimes abbreviated simply as "PVA(A)", unless otherwise indicated). This dispersion stabilizer for suspension polymerization may further contain a PVA other than PVA (A) (for example, a vinyl alcohol polymer (B), as described later, having a degree of saponification of 65 mol % or more and a viscosity average degree of polymerization of 600 or more) and other components. These components are each described in detail.

[PVA(A)]

PVA(A) used in the present invention has an aliphatic hydrocarbon group at its terminal, and it is important that the carbon number of the terminal aliphatic hydrocarbon group contained in PVA(A) be 6 or more and 18 or less in terms of the production efficiency of PVA(A) and the requirements for the dispersion stabilizer. When the carbon number of the terminal aliphatic hydrocarbon group is less than 6, the boiling point of a chain transfer agent for introducing an aliphatic hydrocarbon group is too low, which makes it difficult to separate the chain transfer agent from other materials (vinyl ester monomers such as vinyl acetate and a solvent such as methanol) in a recovery step in the production of PVA(A). When the carbon number of the terminal aliphatic hydrocarbon group is less than 6, it is difficult to remove monomer components from the resulting vinyl resin particles and the plasticizer absorptivity of the vinyl resin particles decreases. The carbon number of the terminal aliphatic hydrocarbon group in PVA(A) is preferably 8 or more. On the other hand, when the carbon number of the terminal aliphatic hydrocarbon group in PVA(A) is more than 18, the solubility of the chain transfer agent in a solvent such as methanol, which is suitably used in the polymerization process in the production of PVA(A), decreases. Therefore, in an operation in which a chain transfer agent for introducing an aliphatic hydrocarbon group during polymerization is dissolved in a solvent such as methanol and the resulting solution is sequentially added, precipitation of the chain transfer agent occurs due to its low solubility, which makes it difficult to further add the solution. Furthermore, the addition of the solution containing the chain transfer agent remaining undissolved results in a heterogeneous polymerization reaction. As described above, the carbon number of more than 18 leads to complex operations in the production process and product quality control problems. The carbon number of the terminal aliphatic hydrocarbon group contained in PVA(A) is preferably 15 or less.

The structure of the terminal aliphatic hydrocarbon group having 6 to 18 carbon atoms in PVA(A) is not particularly limited, and it may be linear, branched, or cyclic. Examples of the aliphatic hydrocarbon group include a saturated aliphatic hydrocarbon group (alkyl group), an aliphatic hydrocarbon group having a double bond (alkenyl group), and an aliphatic hydrocarbon group having a triple bond (alkynyl group). In terms of the economic efficiency and productivity of a chain transfer agent for introducing an aliphatic hydrocarbon group, the aliphatic hydrocarbon group is preferably an alkyl group, and more preferably a linear alkyl group or a branched alkyl group.

The manner in which the aliphatic hydrocarbon group is bonded to the terminal of PVA(A) is not particularly limited. Preferably, in terms of ease of production, the aliphatic hydrocarbon group is bonded directly to the terminal of the main chain of PVA(A) through a thioether sulfur (—S—). Preferably, PVA(A) has an alkylthio group, an alkenylthio group, or an alkynylthio group bonded directly to the terminal of the main chain of PVA(A). More preferably, PVA(A) has an alkylthio group bonded directly to the terminal of the main chain of PVA(A).

Examples of the alkylthio group having 6 to 18 carbon atoms include a n-heyxylthio group, a cyclohexylthio group, an adamantylthio group, a n-heptylthio group, a n-octylthio group, a n-nonylthio group, a n-decylthio group, a n-undecylthio group, a n-dodecylthio group, a t-dodecylthio group, a n-hexadecylthio group, and a n-octadecylthio group.

It is important that PVA (A) used in the present invention have an ionic group, in particular, an anionic group in its side chain. When PVA(A) does not have an anionic group, precipitation occurs due to its low water solubility or water dispersibility and thus its handleability significantly gets worse. The use of an organic solvent such as methanol may prevent precipitation. However, due to recent enhancement of awareness of global environment, it is not preferable to use a solvent other than water to conduct suspension polymerization of a vinyl compound using a dispersion stabilizer for suspension polymerization, and users avoid the use of such a solvent.

Examples of the anionic group include a carboxylic acid anionic group (—COO⁻) and a sulfonic acid anionic group (—SO₃⁻). Among these, a carboxylic acid anionic group (—COO⁻) is preferred because the polymerization stability of the resulting dispersion stabilizer for suspension polymerization is increased.

The manner in which PVA(A) has an anionic group in its side chain is, for example, a manner in which PVA(A) contains a repeating unit having an anionic group. The repeating unit having an anionic group is not particularly limited. Examples of such a repeating unit include a comonomer unit having an anionic group, a unit obtained by reaction of a hydroxyl group in a vinyl alcohol unit with a compound having an anionic group and a group reactive with the hydroxyl group, and a unit obtained by reaction of an ester group in a vinyl ester monomer unit with a compound having an anionic group and a group reactive with the ester group. A comonomer having an anionic group, a compound having an anionic group and a group reactive with a hydroxyl group, and a compound having an anionic group and a group reactive with an ester group are described later.

The content of anionic groups in PVA(A) (i.e., the degree of modification of anionic groups) is not particularly limited. It is preferably 0.05 mol % or more based on all the repeating units of PVA(A) in terms of imparting water solubility or water dispersibility. It is preferably 10 mol % or less in terms of productivity, cost, and the requirements for the dispersion stabilizer for suspension polymerization. When the content of anionic groups is less than 0.05 mol %, the water solubility or water dispersibility decreases and precipitation occurs in water, which may result in poor handleability. When the content of anionic groups is more than 10 mol %, the productivity and economic efficiency may decrease due to increased use of a modifying agent, or the effect of the dispersion stabilizer for suspension polymerization may decrease. The lower limit of the content is more preferably 0.1 mol % or more, and even more preferably 0.3 mol % or more. The upper limit of the content is more preferably less than 7 mol %, even more preferably less than 5 mol %, and particularly preferably less than 2 mol %. The content of anionic groups in PVA(A) can be determined by $^1$H-NMR spectroscopy. For example, the content of anionic groups can be calculated from the integrated value of the characteristic proton peak of each repeating unit of PVA (A), which is observed in the obtained $^1$H-NMR spectrum, by taking into account the number of anionic groups in the repeating units each having one anionic group. The characteristic peak as used herein refers to a peak that does not overlap another peak, or a peak with an integrated value that can be calculated based on the relationship with another peak, if it overlaps the other peak.

PVA(A) used in the present invention is a partially saponified PVA, and therefore contains, as repeating units, a vinyl alcohol unit and a vinyl ester monomer unit in addition to the above-mentioned repeating unit having an anionic group. It is important that the degree of saponification of PVA(A) be 20 mol % or more and less than 65 mol %, in terms of the requirements for the dispersion stabilizer. When the degree of saponification of PVA(A) is less than 20 mol %, various problems occur such that it is difficult to remove monomer components from vinyl resin particles obtained by suspension polymerization of a vinyl compound, the plasticizer absorptivity of the resulting vinyl resin particles decreases, and the water solubility of PVA(A) decreases and PVA(A) is precipitated to form a precipitate. The degree of saponification of PVA(A) is preferably 25 mol % or more, more preferably 30 mol % or more, and even more preferably 33 mol % or more. On the other hand, when the degree of saponification of PVA(A) is 65 mol % or more, it is difficult to remove monomer components from vinyl resin particles obtained by suspension polymerization of a vinyl compound, and the plasticizer absorptivity of the resulting vinyl resin particles decreases. The degree of saponification of PVA(A) is preferably 60 mol % or less, and more preferably 55 mol % or less.

The degree of saponification of PVA(A) can be determined by $^1$H-NMR spectroscopy, based on the ratio of hydroxyl groups calculated as vinyl alcohol units to residual ester groups calculated as vinyl ester monomer units or by the method according to JIS K 6726 (1994). However, when the latter method is used to determine the degree of saponification, the repeating units of the PVA(A) include other repeating units such as a repeating unit having an anionic group in addition to vinyl ester monomer units and vinyl alcohol units. If the degree of saponification is calculated without any correction, the difference between the resulting degree of saponification and the true degree of saponification increases as the molecular weight and the degree of modification of the repeating units other than the vinyl ester monomer units and the vinyl alcohol units increase. Therefore, when the degree of saponification of a PVA having repeating units other than vinyl ester monomer units and vinyl alcohol units is determined by the method according to JIS K 6726 (1994), it is necessary to calculate the degree of saponification by assigning the average molecular weight of the PVA determined by taking into account not only the vinyl ester monomer units and vinyl alcohol units but also the other repeating units, to the term of the average molecular weight of the equation for calculating the degree of saponification according to JIS K 6726 (1994). The degree of saponification determined by this method is almost equal to that determined by $^1$H-NMR spectroscopy.

PVA(A) used in the present invention may further contain a repeating unit other than a vinyl ester monomer unit, a vinyl alcohol unit, and a repeating unit having an anionic group, without departing from the scope of the present invention. Examples of the other repeating unit include units derived from comonomers copolymerizable with vinyl ester monomers and having no anionic group. Examples of the comonomers are described later. The content of the comonomer units is preferably 10 mol % or less of all the repeating units of PVA(A).

It is important that the viscosity average degree of polymerization (P) of PVA(A) used in the present invention be 100 or more. When the viscosity average degree of polymerization (P) of PVA(A) is less than 100, the polymerization stability in suspension polymerization of a vinyl compound decreases, which causes various problems such that vinyl resin particles obtained by suspension polymerization are coarse, and particles having a uniform particle size cannot be obtained. It is also important that the viscosity average degree of polymerization (P) of PVA(A) be less than 600. When the viscosity average degree of polymerization (P) of PVA(A) is 600 or more, it is difficult to remove monomer components from vinyl resin particles obtained by suspension polymerization of a vinyl compound, and the plasticizer absorptivity of the resulting vinyl resin particles decreases. The viscosity average degree of polymerization (P) of PVA(A) is preferably 500 or less, and more preferably 450 or less.

The viscosity average degree of polymerization (P) of PVA(A) can be calculated using Nakajima's equation (Akio Nakajima, "Kobunshi-Kagaku" (Polymer Science) 6 (1949) from the limiting viscosity of an acetone solution of a vinyl ester polymer produced by substantially completely saponifying a PVA, followed by acetylation.

It is preferable that in the dispersion stabilizer for suspension polymerization of the present invention, the relationship between the viscosity average degree of polymerization (P) of PVA(A) and the degree of modification (S) (mol %) of the aliphatic hydrocarbon group satisfy the following formula (1):

$$50 \leq S \times P/1.880 < 100 \tag{1}$$

In the above formula (1), the value represented by "S×P/1.880" shows the approximate rate of introduction of a chain transfer agent having an aliphatic hydrocarbon group in the synthesis of PVA(A). It is preferable that the "S×P/1.880" value be 50 or more. When the "S×P/1.880" value is less than 50, it is difficult to remove monomer components from the resulting vinyl resin particles and the plasticizer absorptivity of the resulting vinyl resin particles decreases, which means that the dispersion stabilizer is less effective. The "S×P/1.880" value is preferably 55 or more, and more preferably 60 or more.

It is also preferable that the "S×P/1.880" value be less than 100 because it is difficult to synthesize PVA(A) having a "S×P/1.880" value of 100 or more. In chain transfer polymerization, the main reaction is a reaction in which a chain transfer agent is introduced into one terminal of the resulting PVA(A). Therefore, in order to achieve the "S×P/1.880" value of 100 or more, it is necessary, for example, to perform a special operation or add a special catalyst to promote bimolecular termination in the polymerization process for producing PVA(A) so as to increase the probability of formation of PVA(A) into which two or more aliphatic hydrocarbon groups are introduced. It is further necessary to perform an operation of significantly reducing the polymerization conversion rate or significantly reducing the ratio of a solvent used for the polymerization to vinyl ester monomers such as vinyl acetate so as to inhibit a side reaction in which the solvent is introduced into one terminal of PVA(A). Performing such an operation leads to problems such as higher cost, lower productivity, and uncontrolled quality, and is therefore impractical and undesirable.

In the above formula (1), the viscosity average degree of polymerization (P) is divided by 1.880 to convert the viscosity average degree of polymerization (P) to the number average degree of polymerization (Pn). In the radical polymerization step in the synthesis of PVA(A), when the ratio of the number average degree of polymerization (Pn) to the weight average degree of polymerization (Pw) (Pn/Pw) is 1/2 assuming that the polymerization proceeds ideally, the relationship between the number average degree of polymerization (Pn) and the viscosity average degree of polymerization (P) can be determined by Mark-Houwink-Sakurada equation: $[\eta]=KM^{\alpha}$, where $[\eta]$ is the limiting viscosity of a polymer, M is the molecular weight thereof, and K and α are constants. In this equation, 0.74, that is the α value of polyvinyl acetate in acetone, is used to calculate the ratio of the viscosity average degree of polymerization (P) to the number average degree of polymerization (Pn) (P/Pn). Thus, the ratio of 1.880 is obtained. This ratio is combined with the degree of modification (S) (mol %) of aliphatic hydrocarbon groups to derive an equation representing the approximate rate of introduction of a chain transfer agent having aliphatic hydrocarbon groups in the synthesis of PVA(A) (see Takayuki Otsu: "Kaitei Kobunshi Gosei No Kagaku (The Chemistry of Polymer Synthesis, revised edition), 11 (1979), and Akio Nakajima, "Kobunshi-Kagaku" (Polymer Science) 6 (1949), The Society of Polymer Science: "Kobunshi Kagaku Jikkenhou" (Experimental Methods in Polymer Science)).

The degree of modification (S) (mol %) of the aliphatic hydrocarbonl groups described above refers to the molar percentage of the aliphatic hydrocarbon groups in all the repeating units of PVA(A), and can be determined by $^1$H-NMR spectroscopy. For example, the degree of modification can be calculated from the integrated value of the characteristic proton peak of each repeating unit of PVA(A) and the integrated value of the characteristic proton peak of the terminal aliphatic hydrocarbon group, which are observed in the obtained $^1$H-NMR spectrum. The characteristic peak as used herein refers to a peak that does not overlap another peak, or a peak with an integrated value that can be calculated based on the relationship with another peak, if it overlaps the other peak. The numerical values in the above formula (1) can be adjusted according to the type and amount of the vinyl ester monomer, the type and amount of the chain transfer agent, the polymerization conditions such as a catalyst and a solvent, etc.

In sequences of vinyl ester monomer units and/or vinyl alcohol units of PVA(A), the block character of the vinyl ester monomer units is preferably 0.6 or less, and more preferably 0.5 or less. When the block character is more than 0.6, it may be difficult to remove monomer components from the resulting vinyl resin particles, or the plasticizer absorptivity of the resulting vinyl resin particles may decrease.

The term "block character" mentioned above denotes a value representing the distribution of the residual ester groups and hydroxyl groups that have replaced ester groups during saponification thereof, and the value is between 0 and 2. The value "0" indicates that all the residual ester groups or hydroxyl groups are distributed in blocks. As the value increases, alternation between these groups increases. Then, the value "1" indicates that the residual ester groups and hydroxyl groups are present completely at random, and the value "2" indicates that the residual ester groups and hydroxyl groups are present completely alternately. The residual ester group refers to an ester group (—O—C(═O)—Y (where Y is a hydrocarbon group other than $CH_2$═CH—O—C(═O) contained in the vinyl ester monomer)) contained in the vinyl ester monomer unit in the vinyl alcohol polymer (A) obtained by saponification. In PVA(A), sequences of vinyl ester monomer units and/or vinyl alcohol units are present in a fragmentary manner due to the presence of the other repeating units such as a repeating unit having an anionic group. In this description, the block character is calculated taking into account all of these fragmentary sequences of the units and can be determined by $^{13}$C-NMR spectroscopy.

The block character mentioned above can be adjusted according to the type of the vinyl ester monomer, the saponification conditions such as a catalyst and a solvent, heat treatment after the saponification, etc.

The production method of PVA(A) is not particularly limited, and various methods can be used. As a simple and easy way, it is possible to combine a method of introducing an aliphatic hydrocarbon group having 6 to 18 carbon atoms into the terminal of a partially saponified PVA and a method of introducing an anionic group into the side chain of a partially saponified PVA.

Examples of the method for introducing an aliphatic hydrocarbon group having 6 to 18 carbon atoms into the terminal of a partially saponified PVA include: (i) a method in which a vinyl ester monomer is polymerized in the presence of a chain transfer agent having an aliphatic hydrocarbon group having 6 to 18 carbon atoms to obtain a vinyl ester polymer and then the vinyl ester polymer is partially saponified; and (ii) a method in which a functional group is introduced to the terminal of a partially saponified PVA so as to react the functional group at the terminal with a compound having a group reactive with the functional group and an aliphatic hydrocarbon group having 6 to 18 carbon atoms.

Examples of the method for introducing an anionic group into the side chain of a partially saponified PVA include: (iii) a method in which a vinyl ester monomer and a comonomer having an anionic group are copolymerized to obtain a vinyl ester copolymer having an anionic group in its side chain and then the copolymer thus obtained is partially saponified; (iv) a method in which a vinyl ester monomer is polymerized to obtain a vinyl ester polymer, the vinyl ester polymer thus obtained is partially saponified, and then a compound having an anionic group and a group reactive with a hydroxyl group is reacted with a hydroxyl group of a vinyl alcohol unit of the partially saponified polymer; (v) a method in which a vinyl ester monomer is polymerized to obtain a vinyl ester polymer, a compound having an anionic group and a group reactive with an ester group is reacted with an ester group of a vinyl ester monomer unit of the vinyl ester polymer thus obtained, and then the resulting polymer is partially saponified; and (vi) a method in which a vinyl ester monomer is polymerized to obtain a vinyl ester polymer, the vinyl ester polymer thus obtained is partially saponified, and then a compound having an anionic group and a group reactive with an ester group is reacted with an ester group of a vinyl ester unit of the partially saponified polymer, for example, an ester exchange reaction with dicarboxylic acid.

As a method for introducing an aliphatic hydrocarbon group into the terminal of a partially saponified PVA, the method (i) is preferred because an aliphatic hydrocarbon group can be introduced more economically and efficiently. In particular, it is preferable to use a method in which a vinyl ester such as vinyl acetate is polymerized in the presence of alkylthiol as a chain transfer agent to obtain a vinyl ester polymer and then the vinyl ester polymer is partially saponified (see JP 57(1982)-28121 A and JP 57(1982)-105410 A). As a method for introducing an anionic group into the side chain of a partially saponified PVA, the method (iii) is preferred in terms of productivity and cost. Therefore, a preferred production method of PVA(A) is a combination of the method (i) and the method that is, a method (vii) in which a vinyl ester monomer and a comonomer having an anionic group are copolymerized in the presence of a chain transfer agent having an aliphatic hydrocarbon group having 6 to 18 carbon atoms to obtain a vinyl ester copolymer having an anionic group in its side chain and then the copolymer thus obtained is partially saponified.

Examples of the vinyl ester monomer used in the production of PVA(A) include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among these, vinyl acetate is most preferred.

There is no particular limitation on the comonomer having an anionic group as long as it has an anionic group and a vinyl group copolymerizable with a vinyl ester monomer. Examples of such a comonomer include a comonomer having a carboxyl group or a salt thereof (including a —COO$^-$ group) and a comonomer having a sulfonic acid group or a salt thereof (including a —SO$_3^-$ group).

Examples of a comonomer having a carboxyl group or a salt thereof include monomers such as (meth)acrylic acid, crotonic acid, 2-pentenoic acid, maleic acid, maleic anhydride, maleic acid monoester, fumaric acid, fumaric acid monoester, itaconic acid, itaconic anhydride, itaconic acid monoester, citraconic acid, citraconic anhydride, citraconic acid monoester, mesaconic acid, mesaconic acid monoester, aconitic acid, and aconitic acid monoester/diester, and salts thereof. Examples of a comonomer having a sulfonic acid or a salt thereof include, but not limited to, monomers represented by the following general formulae (a) to (e).

[Chemical Formula 1]

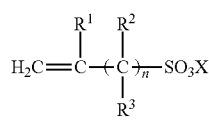
(a)

[Chemical Formula 2]

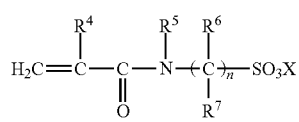
(b)

[Chemical Formula 3]

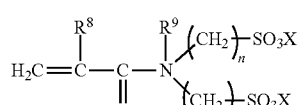
(c)

[Chemical Formula 4]

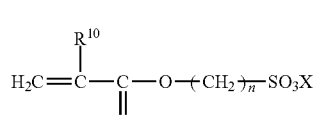
(d)

[Chemical Formula 5]

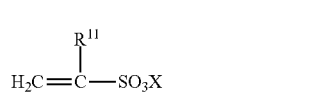
(e)

In the above formulae, $R^1$ to $R^{11}$ are the same or each independently a hydrogen atom or a methyl group, X is a hydrogen atom, an alkali metal ion (such as a lithium, sodium, or potassium ion), or an ammonium ion, and n is an integer of 1 to 4.

The above-mentioned comonomers having an anionic group may be used alone, or two or more different comonomers may be used in combination.

In the synthesis of PVA(A), the vinyl ester monomer can be copolymerized with a comonomer copolymerizable with the vinyl ester monomer and having no anionic group, without departing from the scope of the present invention. Examples of the monomer that can be used as such a comonomer include: α-olefins such as ethylene, propylene, n-butene, and isobutylene; acrylamide; acrylamide derivatives such as N-methylacrylamide, N-ethylacrylamide, N,N-dimethylacrylamide, diacetone acrylamide, acrylamide propyldimethylamine and salts or quaternary salts thereof, and N-methylolacrylamide and derivatives thereof; methacrylamide; methacrylamide derivatives such as N-methylmethacrylamide, N-ethylmethacrylamide, methacrylamide propyldimethylamine and salts or quaternary salts thereof, and N-methylolmethacrylamide and derivatives thereof; esters such as acrylic acid ester, methacrylic acid ester, crotonic acid ester, itaconic acid diester, maleic acid diester, fumaric acid diester, citraconic acid diester, mesaconic acid diester, and aconitic acid triester; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, 2,3-diacetoxy-1-vinyloxypropane; nitriles such as acrylonitrile and meth-acrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane, and allyl chloride; monomers having a polyoxyalkylene group such as polyoxyethylene allyl ether, polyoxypropylene allyl ether, and polyoxyethylene acrylamide; vinylsilyl compounds such as vinyltrimethoxysilane; and isopropenyl acetate. The amount of copolymerized comonomers copolymerizable with such vinyl ester monomers and having no anionic group is usually 10 mol % or less.

Examples of the chain transfer agent having an aliphatic hydrocarbon group having 6 to 18 carbon atoms include alcohol, aldehyde, and thiol, each having an aliphatic hydrocarbon group having a 6 to 18 carbon atoms. Alkylthiol having 6 to 18 carbon atoms is preferably used. Examples of the alkylthiol having 6 to 18 carbon atoms include n-hexanethiol, cyclohexanethiol, adamantanethiol, n-heptanethiol, n-octanethiol, n-nonanethiol, n-decanethiol, n-undecanethiol, n-dodecanethiol, t-dodecanethiol, n-hexadecanethiol, and n-octadecanethiol.

In the synthesis of PVA(A), the temperature at which a vinyl ester monomer and a comonomer having an anionic group are polymerized (copolymerized) in the presence of a chain transfer agent is not particularly limited. The temperature is preferably 0° C. or higher and 200° C. or lower, and more preferably 30° C. or higher and 140° C. or lower. The polymerization temperature lower than 0° C. is undesirable because the polymerization does not proceed at a sufficiently high rate. When the polymerization temperature is higher than 200° C., it is difficult to obtain a desired polymer. The temperature for the polymerization is controlled to 0° C. or higher and 200° C. or lower, for example, by a method of controlling the polymerization rate so as to achieve a balance between the heat generated by the polymerization and the heat released from the surface of a reactor, or a method of using an external jacket with an appropriate heat medium to control the polymerization temperature. The latter method is preferred in terms of safety.

The polymerization described above can be conducted by any of the polymerization processes such as batch polymerization, semi-batch polymerization, continuous polymerization, and semi-continuous polymerization. The polymerization can be conducted by any of the known polymerization methods such as bulk polymerization, solution polymerization, suspension polymerization, and emulsion polymerization. Among these, bulk polymerization in which polymerization is conducted under solvent-free conditions or solution polymerization in which polymerization is conducted in the presence of an alcoholic solvent is suitably used. In order to produce a polymer with a high degree of polymerization, emulsion polymerization is used. Examples of the alcoholic solvent used for solution polymerization include, but not limited to, methanol, ethanol, and n-propanol. Two or more of these solvents may be used in combination.

An initiator used for the polymerization can be appropriately selected from conventionally known azo initiators, peroxide initiators, redox initiators, etc. depending on the polymerization method. Examples of azo initiators include 2,2'-azobisisobutyronitrile, 2,2'-azobis(2,4-dimethylvaleronitrile), and 2,2'-azobis(4-methoxy-2,4-dimethylvaleronitrile). Examples of peroxide initiators include: percarbonate compounds such as diisopropyl peroxydicarbonate, di-2-ethylhexyl peroxydicarbonate, and diethoxyethyl peroxydicarbonate; perester compounds such as t-butyl peroxyneodecanoate, α-cumyl peroxyneodecanoate, and t-butyl peroxydecanoate; acetylcyclohexylsulfonyl peroxide; and 2,4,4-trimethylpentyl-2-peroxyphenoxy acetate. Furthermore, any of the above-mentioned initiators can be combined with, for example, potassium persulfate, ammonium persulfate, or hydrogen peroxide, to be used as an initiator. Examples of redox initiators include combinations of any of the above-mentioned peroxides with a reducing agent such as sodium bisulfite, sodium bicarbonate, tartaric acid, L-ascorbic acid, or Rongalite.

When the polymerization is conducted at high temperatures, PVA may be stained due to decomposition of a vinyl ester monomer. In such a case, an antioxidizing agent such as tartaric acid in an amount of about 1 ppm or more and 100 ppm or less relative to the mass of the vinyl ester monomers may be added to the polymerization system to protect the PVA from being stained.

For the purpose of adjusting the degree of polymerization of a vinyl ester polymer obtained by the polymerization, the polymerization may be conducted in the presence of another chain transfer agent without departing from the scope of the present invention. Examples of the chain transfer agent include: aldehydes such as acetaldehyde and propionaldehyde; ketones such as acetone and methyl ethyl ketone; mercaptans such as 2-hydroxyethanethiol; halogenated hydrocarbons such as trichloroethylene and perchloroethylene; and phosphinates such as sodium phosphinate monohydrate. Among these, aldehydes and ketones are suitably used. The amount of the chain transfer agent to be added may be determined according to the chain transfer constant of the chain transfer agent to be added and the target degree of polymerization of the vinyl ester polymer. Generally, the amount is desirably 0.1 mass % or more and 10 mass % or less with respect to the vinyl ester monomers.

Any type of stirring blade can be used for the polymerization without any limitation. Examples of the stirring blade include anchor blades, paddle blades and Maxblend blades. A Maxblend blade can improve the stirring efficiency, so that the ratio of the weight average molecular weight (Mw) of the resulting vinyl ester polymer to the number average molecular weight (Mn) thereof (Mw/Mn) can be reduced. This means that the use of a Maxblend blade is preferred because it makes it possible to obtain a vinyl ester polymer with a narrower molecular weight distribution and thus to improve the effect of the dispersion stabilizer for suspension polymerization of the present invention.

An alcoholysis or hydrolysis reaction using a conventionally known basic catalyst such as sodium hydroxide, potassium hydroxide, or sodium methoxide, or a conventionally known acid catalyst such as p-toluenesulfonic acid, hydrochloric acid, sulfuric acid, or nitric acid can be used for the saponification reaction of the vinyl ester polymer. Examples of the solvent to be used for this reaction include: alcohols such as methanol and ethanol; esters such as methyl acetate and ethyl acetate; ketones such as acetone and methyl ethyl ketone; and aromatic hydrocarbons such as benzene and toluene. These solvents can be used alone or in combination of two or more thereof. In particular, it is easy and preferable to carry out the saponification reaction using methanol or a methanol/methyl acetate mixed solution as a solvent and sodium hydroxide as a catalyst. The concentration of the vinyl ester polymer in alcohol is not particularly limited but can be selected within a range of 10 to 80 mass %. The amount of alkali or acid used is adjusted according to the target degree of saponification. The amount of alkali or acid is preferably 1 to 100 mmol equivalent to the vinyl ester polymer, in terms of preventing staining of PVA and minimizing the amount of sodium acetate. In the saponification using alkali, when the functional group introduced to the vinyl ester polymer consumes alkali, like acid, the amount of the alkali to be added may be increased from the above range to compensate the consumption for the saponification. The saponification temperature is not particularly limited, and it is in a range of 10° C. to 70° C., and preferably 30° C. to 40°

C. When the saponification reaction is conducted using acid, the reaction rate may be lower than that of a reaction using alkali. Therefore, the saponification may be conducted at a higher temperature than that using alkali. The reaction time is not particularly limited, and it is about 30 minutes to 5 hours.

Even when a method other than the above-mentioned method (vii) is used to produce PVA(A), the same polymerization conditions and saponification conditions as described above can be adopted. For example, when any of the following methods is used as a combination of the method (i) and the method (iv), (v) or (vi) to produce PVA(A), the same polymerization conditions and saponification conditions as described above can be adopted: (viii) a method in which a vinyl ester monomer is polymerized in the presence of a chain transfer agent having an aliphatic hydrocarbon group having 6 to 18 carbon atoms to obtain a vinyl ester polymer, the vinyl ester polymer thus obtained is partially saponified, and then a compound having an anionic group and a group reactive with a hydroxyl group is reacted with a hydroxyl group of a vinyl alcohol unit of the partially saponified polymer; (ix) a method in which a vinyl ester monomer is polymerized in the presence of a chain transfer agent having an aliphatic hydrocarbon group having 6 to 18 carbon atoms to obtain a vinyl ester polymer, a compound having an anionic group and a group reactive with an ester group is reacted with an ester group of a vinyl ester monomer unit of the vinyl ester polymer thus obtained, and then the resulting polymer is partially saponified; and (x) a method in which a vinyl ester monomer is polymerized in the presence of a chain transfer agent having an aliphatic hydrocarbon group having 6 to 18 carbon atoms to obtain a vinyl ester polymer, the vinyl ester polymer thus obtained is partially saponified, and then a compound having an anionic group and a group reactive with an ester group is reacted with an ester group of a vinyl ester monomer unit of the partially saponified polymer thus obtained. Examples of the compound having an anionic group and a group reactive with a hydroxyl group and the compound having an anionic group and a group reactive with an ester group include compounds having two or more carboxyl groups (such as dicarboxylic acid compounds) and salts thereof; compounds having two or more sulfonic acid groups (such as disulfonic acid compounds) and salts thereof; and compounds having an aldehyde group and a carboxyl group in the molecule and salts thereof. After these reactions, treatment with a base or the like may be carried out to convert acid moieties into a metal salt.

[PVA(B)]

Preferably, the dispersion stabilizer for suspension polymerization of the present invention further contains, in addition to PVA(A) described above, PVA(B) having a viscosity average degree of polymerization of 600 or more and a degree of saponification of 65 mol % or more. Further addition of PVA(B) having a higher degree of saponification and a higher viscosity average degree of polymerization than PVA(A) makes it possible to further improve the polymerization stability and to further prevent formation of coarse particles.

The degree of saponification of PVA(B) used in the present invention is 65 mol % or more, preferably 65 mol % or more and 95 mol % or less, and more preferably 68 mol % or more and 90 mol % or less. When the degree of saponification of PVA(B) is less than 65 mol %, the water-solubility of PVA(B) decreases, which may lead to poorer handleability. In addition, the polymerization stability decreases, which may lead to formation of coarse vinyl resin particles. The degree of saponification of PVA(B) can be determined according to JIS K 6726 (1994).

The viscosity average degree of polymerization of PVA(B) is 600 or more, preferably 600 or more and 8000 or less, and more preferably 600 or more and 3500 or less. When the viscosity average degree of polymerization of PVA(B) is less than 600, the polymerization stability in suspension polymerization of a vinyl compound may decrease. The viscosity average degree of polymerization of PVA(B) can be determined in the same manner as for PVA(A) described above, and it can also be determined according to JIS K 6726 (1994).

One type of PVA(B) may be used alone, or two or more types of PVA(B) having different properties may be used in combination.

The mass ratio between PVA(A) and PVA(B) used ([PVA(A)]/[PVA(B)]) is preferably 10/90 to 55/45, and more preferably 15/85 to 50/50. When the mass ratio is lower than 10/90, the effect of the dispersion stabilizer may be reduced. For example, it may be difficult to remove monomer components from vinyl resin particles obtained by suspension polymerization of a vinyl compound, or the plasticizer absorptivity of the resulting vinyl resin particles may decrease. On the other hand, when the mass ratio is higher than 55/45, the polymerization stability in suspension polymerization of a vinyl compound decreases, which may cause problems such that vinyl resin particles obtained by suspension polymerization are coarse, and particles having a uniform particle size cannot be obtained.

When the dispersion stabilizer for suspension polymerization of the present invention contains PVA(B), it may be a product in the form of a mixture of PVA(A) and PVA(B), or a two-component product consisting of separately packaged PVA(A) and PVA(B).

[Other Components]

The dispersion stabilizer for suspension polymerization of the present invention may further contain a PVA other than PVA(A) and PVA(B) described above, without departing from the scope of the present invention. For example, the dispersion stabilizer of the present invention may contain a PVA having a degree of saponification of 20 mol % or more and less than 65 mol %, a viscosity average degree of polymerization (P) of 100 or more and less than 600, having an anionic group in its side chain, and having no aliphatic hydrocarbon group having 6 to 18 carbon atoms at its terminal. This PVA can be produced when an aliphatic hydrocarbon group in a chain transfer agent is not introduced to the terminal of the PVA during the synthesis of PVA(A).

The dispersion stabilizer for suspension polymerization of the present invention may further contain other additives, without departing from the scope of the present invention. Examples of the additives include: polymerization regulators such as aldehydes, halogenated hydrocarbons, and mercaptans; polymerization inhibitors such as phenol compounds, sulfur compounds, N-oxide compounds; pH adjusters; cross-linking agents; preservatives; mildewcides; antiblocking agents; antifoaming agents; and compatibilizing agents.

The dispersion stabilizer for suspension polymerization of the present invention may be a solid but may also be in the form of a solution or a dispersion. Therefore, the stabilizer may contain a solvent or a dispersion medium. There is no particular limitation on the solvent or the dispersion medium. It is preferably water in terms of environmental impact. There is no particular limitation on the concentration of the dispersion stabilizer for suspension polymerization in the form of a solution or a dispersion. The concentration can be determined appropriately according to the desired concentration and handleability for use.

[Intended Use (Method for Producing Vinyl Resin)]

The dispersion stabilizer for suspension polymerization of the present invention is used for suspension polymerization of vinyl compounds. In another aspect, the present invention is a method for producing a vinyl resin, including conducting suspension polymerization of a vinyl compound in the presence of the above-mentioned dispersion stabilizer for suspension polymerization.

Examples of the vinyl compound include: vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; styrene, acrylonitrile, vinylidene chloride, and vinyl ethers or the like. Among these, vinyl chloride is preferred. A combination of vinyl chloride and a monomer copolymerizable with vinyl chloride is also preferred. Examples of the monomer copolymerizable with vinyl chloride include: vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile, styrene, vinylidene chloride, and vinyl ethers or the like.

In a suspension polymerization method of a vinyl compound, an oil-soluble or water-soluble polymerization initiator, which is conventionally used for polymerization of vinyl chloride or the like, can be used. Examples of the oil-soluble polymerization initiator include: percarbonate compounds such as diisopropyl peroxydicarbonate, di-2-ethylhexyl peroxydicarbonate, and diethoxyethyl peroxydicarbonate; perester compounds such as t-butyl peroxyneodecanoate, t-butylperoxypivalate, t-hexyl peroxypivalate, and α-cumyl peroxyneodecanoate; peroxides such as acetylcyclohexylsulfonyl peroxide, 2,4,4-trimethylpentyl-2-peroxyphenoxyacetate, 3,5,5-trimethylhexanoyl peroxide, and lauroyl peroxide; and azo compounds such as azobis-2,4-dimethylvaleronitrile and azobis(4-2,4-dimethylvaleronitrile). Examples of the water-soluble polymerization initiator include potassium persulfate, ammonium persulfate, hydrogen peroxide, and cumene hydroperoxide. These oil-soluble or water-soluble polymerization initiators can be used alone or in combination of two or more thereof.

In suspension polymerization of a vinyl compound, the polymerization temperature is not particularly limited and can be adjusted to not only a lower temperature of about 20° C. but also a higher temperature exceeding 90° C. Furthermore, in one of the preferred embodiments, a polymerizer equipped with a reflux condenser is used in order to increase the heat removal efficiency of the polymerization reaction system.

When a vinyl resin is produced using the above-mentioned dispersion stabilizer for suspension polymerization, the dispersion stabilizer is highly effective in removing monomer components from the resulting vinyl resin, regardless of the polymerization temperature. It is particularly effective and thus preferable to use the above-mentioned dispersion stabilizer when the suspension polymerization is conducted at a polymerization temperature of 60° C. or higher at which it is difficult to remove the residual monomer components in the vinyl resin, rather than when the suspension polymerization is conducted at a polymerization temperature of lower than 60° C. at which it is relatively easy to remove the residual monomer components in the vinyl resin.

In suspension polymerization of the vinyl compound, the above-mentioned dispersion stabilizer for suspension polymerization may be used alone or in combination with any of the following: water-soluble cellulose ethers such as methylcellulose, hydroxyethylcellulose, hydroxypropylcellulose, and hydroxypropyl methylcellulose; water-soluble polymers such as gelatin; oil-soluble emulsifiers such as sorbitan monolaurate, sorbitan trioleate, glycerol tristearate, and ethylene oxide/propylene oxide block copolymer; and water-soluble emulsifiers such as polyoxyethylene sorbitan monolaurate, polyoxyethylene glycerol oleate, and sodium laurate, which are used commonly in suspension polymerization of a vinyl compound in an aqueous medium. The amount thereof is not particularly limited, and is preferably 0.01 part by mass or more and 1.0 part by mass or less per 100 parts by mass of the vinyl compound.

There is no particular limitation on how to charge the above-mentioned dispersion stabilizer for suspension polymerization into a polymerization vessel to conduct suspension polymerization of a vinyl compound. For example, when the above-mentioned dispersion stabilizer for suspension polymerization contains PVA(B), a mixture of PVA(A) and PVA(B) may be charged into the vessel. PVA(A) and PVA(B) may be charged separately into the vessel. For example, PVA(A) and PVA(B) may be charged separately into the vessel before the start of the polymerization. It is also possible to charge PVA(A) before the start of the polymerization and then charge PVA(B) after the start of the polymerization.

When the above-mentioned dispersion stabilizer for suspension polymerization is charged into the polymerization vessel, it is preferable to charge the stabilizer in the form of an aqueous solution or a water dispersion thereof without using any organic solvent such as methanol, in terms of handleability and environmental impact.

An ordinary PVA having the range of the degree of saponification of PVA(A) used in the present invention is difficult to be dissolved or dispersed in water due to its low water solubility. Therefore, in order to impart water solubility, the use of a vinyl alcohol polymer having an anionic group or an oxyalkylene group introduced thereinto as a dispersion stabilizer for suspension polymerization has been studied. However, the use of such a vinyl alcohol polymer has problems such that the effects as a dispersion stabilizer for suspension polymerization, more specifically, the polymerization stability, the effect of improving the plasticizer absorptivity of the resulting vinyl polymer particles, the effect of removing monomer components or the like decrease in exchange for improvement of its water solubility. However, since PVA(A) used in the present invention has an anionic group in its side chain and an aliphatic hydrocarbon group having a specific number of carbon atoms at its terminal, it has dramatically enhanced effects as a dispersion stabilizer for suspension polymerization, although it can be handled as an aqueous solution or a water dispersion.

In the suspension polymerization of a vinyl compound, the ratio of the vinyl compound to water is not particularly limited. As the ratio of the vinyl compound to water decreases, the polymerization stability increases but the productivity decreases. On the other hand, as the ratio of the vinyl compound to water increases, the productivity increases but the polymerization stability decreases. Generally, the mass ratio of the vinyl compound to water ([vinyl compound]/[water]) is 4/7 to 5/4. When the ratio is less than 4/7, the productivity of the resulting vinyl resin is low. On the other hand, a ratio of more than 5/4 is undesirable because the polymerization stability significantly decreases, which may lead to formation of coarse vinyl resin particles or increased formation of fish eyes in the resulting product. However, the use of the above-mentioned dispersion stabilizer for suspension polymerization allows the polymerization to proceed stably even under the polymerization conditions where the ratio of the vinyl compound to water is high and the polymerization is likely to be unstable, more specifically, under the polymerization conditions where the mass ratio ([vinyl compound]/[water]) is higher than 3/4. Thus, the mass ratio ([vinyl compound]/[water]) is preferably higher than 3/4 because such a ratio is more effective in preventing formation of coarse vinyl polymer particles. On the other hand, the mass ratio ([vinyl compound]/[water]) is preferably lower than 10/9.

Since the dispersion stabilizer for suspension polymerization of the present invention has high water solubility and can be dissolved or dispersed in water without using an organic solvent such as methanol, it has good handleability. When suspension polymerization of a vinyl compound is conducted in the presence of the dispersion stabilizer for suspension polymerization of the present invention, fewer coarse particles are formed due to high polymerization stability, and the resulting vinyl resin particles have a uniform particle size. Furthermore, even if the amount of the dispersion stabilizer for suspension polymerization of the present invention used is small, the resulting vinyl resin particles have high plasticizer absorptivity and are easy to work with. In addition, the rate of removing residual monomer compounds from vinyl resin particles per unit time is high, and the resulting vinyl resin particles have high monomer removability. The resulting particles can be used for formation of various molded products by adding additives such as a plasticizer, as needed.

EXAMPLES

Hereinafter, the present invention will be described in more detail with reference to examples, but the present invention is not intended to be limited to these examples. In the following examples and comparative examples, "part(s)" and "%" denote "part(s) by mass" and "% by mass (mass %)", respectively, unless otherwise specified.

The PVAs obtained in the following production examples were evaluated by the following methods.

[Viscosity Average Degree of Polymerization of PVA]
The viscosity average degree of polymerization of each PVA was calculated using Nakajima's equation (Akio Nakajima, "Kobunshi-Kagaku" (Polymer Science) 6 (1949)) from the limiting viscosity of an acetone solution of a vinyl ester polymer produced by substantially completely saponifying a PVA, followed by acetylation.

[Degree of Saponification of PVA]
The degree of saponification of each PVA was determined according to JIS K 6726 (1994). The degree of saponification was calculated with a correction to be made with the average molecular weight obtained by taking into account the copolymerized, unsaturated monomer units, in the equation for calculating the degree of saponification according to JIS K 6726 (1994).

[Degree of Modification of Anionic Group]
$^1$H-NMR spectroscopy was used to determine the degree of modification of anionic groups in each PVA in terms of the molar percentage (mol %) of anionic groups in all the repeating units of the PVA.

[Block Character of PVA]
The block character of residual ester groups in each PVA was determined in the following manner. The PVA was dissolved in deuterated water/deuterated methanol mixture solvent to obtain a sample. The sample was subjected to $^{13}$C-NMR spectroscopy at a measurement temperature of 70° C. and 18000 scans were accumulated. Then, three peaks in the dyad present in the methylene region were analyzed so as to calculate the block character from the integrated values of these peaks. The three peaks correspond to: a peak of methylene carbon sandwiched between a carbon atom in the main chain bonded to a residual ester group (—O—C(=O)—Y, where Y is a hydrocarbon group as defined above) and another carbon atom in the main chain bonded to a hydroxyl group; a peak of methylene carbon sandwiched between a carbon atom in the main chain bonded to a residual ester group and another carbon atom in the main chain held close to the carbon atom and bonded to another residual ester group; and a peak of methylene carbon sandwiched between a carbon atom in the main chain bonded to a hydroxyl group and another carbon atom in the main chain held close to the carbon atom and bonded to another hydroxyl group. The $^{13}$C-NMR spectroscopy and the calculation of the block character are described in "Poval" (Kobunshi Kanko Kai, published in 1984, pp. 246 to 249) and Macromolecules, 10, 532 (1977).

[S×P/1.88 Value]
The value of the viscosity average degree of polymerization of each PVA subjected to $^{13}$C-NMR was used as the value of "P". $^1$H-NMR spectroscopy was used to determine the value of "S" in terms of the molar percentage (mol %) of aliphatic hydrocarbon groups in all the repeating units of the PVA. The value of S×P/1.880 was calculated using the P and S values thus determined.

[Water Solubility of PVA]
5 parts of PVA was added to 95 parts of water, and the resulting mixture was stirred at room temperature for 4 hours. Then, the stirring was stopped. Whether precipitation occurred or not was visually examined to evaluate the water solubility according to the following criteria:

A: Transparent solution or dispersion with no precipitation observed

B: Precipitation observed

Production Example 1 (Production of PVA(A1))

Into a polymerization can were charged 1197 parts of vinyl acetate (hereinafter abbreviated as "VAc"), 603 parts of methanol, 0.44 parts of n-dodecanethiol (hereinafter abbreviated as "DDM"), and 1.16 parts of monomethyl maleate. After the air in the can was replaced by nitrogen, the mixture was heated to its boiling point. 2,2'-azobisisobutyronitrile in an amount of 0.05% relative to VAc and 10 parts of methanol were added. Then, the addition of a room-temperature methanol solution of DDM (a concentration of 5 wt. %) and a methanol solution of monomethyl maleate (a concentration of 3 wt. %) into the polymerization can was immediately started, and the addition of the methanol solution of DDM and the methanol solution of monomethyl maleate was continued to keep the concentration of DDM and monomethyl maleate in the polymerization can constant with respect to VAc. The polymerization was thus conducted. Once the polymerization conversion rate reached 40%, the polymerization was stopped. While adding methanol, an operation of removing residual VAc together with methanol from the system was performed under a reduced pressure. Thus, a methanol solution of polyvinyl acetate (hereinafter abbreviated as "PVAc") (a concentration of 63%) was obtained. Next, PVAc in a methanol solvent was saponified for one hour under the conditions of a PVAc concentration of 30%, a temperature of 40° C., and a water content of 1% in the saponification solution using sodium hydroxide as a saponification catalyst added at a molar ratio of 0.0101 with respect to PVAc. The resulting saponified product was neutralized with water and then dried. Thus, PVA(A1) having a viscosity average degree of polymerization of 250, a degree of saponification of 45 mol %, a degree of modification of anionic groups derived from monomethyl maleate of 0.7 mol %, a block character of 0.449, and a "S×P/1.88" value of 76 in the formula (1) was obtained.

Production Examples 2 to 20, 23 to 26, 28, and 29 (Production of PVA(A2) to PVA(A20), PVA(A23), PVA(I) to PVA(III), PVA(V), and PVA(VI))

PVA(A2) to PVA(A20), PVA(A23), PVA(I) to PVA(III), PVA(V), and PVA(VI) shown in Table 2 were produced in the same manner as in Production Example 1, except that the amounts of vinyl acetate and methanol charged, the type, amount, and concentration of a chain transfer agent having an aliphatic hydrocarbon group used in polymerization, the type, amount, and concentration of a comonomer used in copolymerization, the polymerization conditions such as the amount of an initiator used and the target polymerization conversion rate, and the amount of sodium hydroxide used in saponification were changed. Tables 1, 3, 4 and 5 show the production conditions, the types of the chain transfer agents used, the types of the comonomers used, and the saponification conditions, respectively.

Production Example 21 (Production of PVA(A21))

The produced PVA(A1) was heat-treated under a nitrogen atmosphere at 130° C. for 6 hours. Thus, PVA(A21) was obtained. Table 2 shows the values of the physical properties of the produced PVA(A21).

Production Example 22 (Production of PVA(A22))

PVA(A22) shown in Table 2 was produced in the same manner as in Production Example 1, except that saponification was carried out by changing the type and amount of a saponification catalyst, the saponification time, the saponification temperature, and the saponification system water content from those in the saponification step for synthesizing PVA(A1) shown in Production Example 1 and then sodium hydroxide in an amount enough to neutralize the saponification catalyst used was added to stop the saponification reaction. Tables 1, 3, 4, and 5 show the production conditions, the type of the chain transfer agent used, the type of the comonomer used, and the saponification conditions, respectively.

Production Example 27 (Production of PVA(IV))

An attempt to use n-docosanethiol as a chain transfer agent was made but failed because n-docosanethiol was insoluble in methanol and could not be put into the polymerization can as a room-temperature methanol solution. Thus, PVA(IV) could not be produced.

Production Example 30 (Production of PVA(VII))

PVA(VII) shown in Table 2 was produced in the same manner as in Production Example 1, except that a chain transfer agent having an aliphatic hydrocarbon group was not used and that the polymerization conditions such as the amounts of vinyl acetate and methanol charged, the amount of an initiator used, and the type, amount, and concentration of a comonomer used in copolymerization, and the saponification conditions were changed. Table 1 shows the production conditions.

Production Example 31 (Production of PVA(VIII))

PVA(VIII) shown in Table 2 was produced in the same manner as in Production Example 1, except that a comonomer having an anionic group was not used and that the polymerization conditions such as the amounts of vinyl acetate and methanol charged, the amount of an initiator used, and the amount and concentration of a chain transfer agent having an aliphatic hydrocarbon group used, and the type and amount of a comonomer used in copolymerization, and the saponification conditions were changed. Table 1 shows the production conditions.

Production Example 32 (Production of PVA(IX))

PVA(IX) shown in Table 2 was produced in the same manner as in Production Example 1, except that a chain transfer agent having an aliphatic hydrocarbon group was not used and that the polymerization conditions such as the amounts of vinyl acetate and methanol charged, the amount of an initiator used, and the amount and concentration of a comonomer used in copolymerization, and the saponification conditions were changed. Table 1 shows the production conditions.

Production Example 33 (Production of PVA(X))

PVA(X) shown in Table 2 was produced in the same manner as in Production Example 1, except that a comonomer having an anionic group was not used and that the polymerization conditions such as the amounts of vinyl acetate and methanol charged, the amount of an initiator used, and the amount and concentration of a chain transfer agent having an aliphatic hydrocarbon group used, and the saponification conditions were changed. Table 1 shows the production conditions.

Production Example 34 (Production of PVA(XI))

PVA(XI) shown in Table 2 was produced in the same manner as in Production Example 1, except that a comonomer corresponding to a cationic group was used instead of a comonomer having an anionic group and that the polymerization conditions such as the amounts of vinyl acetate and methanol charged, the amount of an initiator used, and the amount and concentration of a chain transfer agent having an aliphatic hydrocarbon group used, and the saponification conditions were changed. Table 1 shows the production conditions.

Production Example 35 (Production of PVA(XII))

Unmodified PVA(XII) shown in Table 2 was produced in the same manner as in Production Example 1, except that a chain transfer agent having an aliphatic hydrocarbon group and a comonomer having an anionic group were not used and that the polymerization conditions such as the amounts of vinyl acetate and methanol charged and the amount of an initiator used, and the saponification conditions were changed. Table 1 shows the production conditions.

TABLE 1

| | | Vinyl acetate (Parts) | Methanol (Parts) | Charging Chain transfer agent having aliphatic hydrocarbon group | | | Unsaturated monomer 1 to be copolymerized | | | Unsaturated monomer 2 to be copolymerized | | | Initiator (wt. %/VAc) | Polymerization conversion rate (%) | Saponification conditions Molar ratio of catalyst with respect to PVAc | Saponification conditions | Post-treatment Heat treatment |
|---|---|---|---|---|---|---|---|---|---|---|---|---|---|---|---|---|---|
| | PVA | | | Type | Initial charge (Parts) | Addition (Parts) | Type | Initial charge (Parts) | Addition (Parts) | Type | Initial charge (Parts) | Addition (Parts) | | | | | |
| Pro. Ex. 1 | PVA(A1) | 1197 | 603 | A | 0.44 | 6.36 | A | 1.16 | 4.63 | — | — | — | 0.05 | 40 | 0.0101 | A | x |
| Pro. Ex. 2 | PVA(A2) | 1197 | 603 | A | 0.44 | 6.36 | A | 1.16 | 4.63 | — | — | — | 0.05 | 40 | 0.0107 | A | x |
| Pro. Ex. 3 | PVA(A3) | 1197 | 603 | A | 0.44 | 6.36 | A | 1.16 | 4.63 | — | — | — | 0.05 | 40 | 0.0097 | A | x |
| Pro. Ex. 4 | PVA(A4) | 1197 | 603 | A | 0.44 | 6.36 | A | 1.16 | 4.63 | — | — | — | 0.05 | 40 | 0.0092 | A | x |
| Pro. Ex. 5 | PVA(A5) | 1188 | 612 | B | 0.31 | 4.55 | A | 1.15 | 4.60 | — | — | — | 0.05 | 40 | 0.0098 | A | x |
| Pro. Ex. 6 | PVA(A6) | 1210 | 590 | C | 0.63 | 9.08 | A | 1.17 | 4.69 | — | — | — | 0.05 | 40 | 0.0098 | A | x |
| Pro. Ex. 7 | PVA(A7) | 1197 | 603 | D | 0.44 | 6.36 | A | 1.16 | 4.63 | — | — | — | 0.05 | 40 | 0.0100 | A | x |
| Pro. Ex. 8 | PVA(A8) | 1184 | 616 | A | 0.43 | 6.29 | B | 0.65 | 2.62 | — | — | — | 0.04 | 40 | 0.0065 | A | x |
| Pro. Ex. 9 | PVA(A9) | 1224 | 576 | A | 0.38 | 5.38 | B | 0.19 | 10.43 | — | — | — | 0.05 | 40 | 0.0210 | A | x |
| Pro. Ex. 10 | PVA(A10) | 1184 | 626 | A | 0.43 | 6.24 | B | 0.05 | 2.84 | — | — | — | 0.04 | 40 | 0.0088 | A | x |
| Pro. Ex. 11 | PVA(A11) | 1184 | 616 | A | 0.43 | 6.24 | C | 0.28 | 3.72 | — | — | — | 0.04 | 40 | 0.0184 | A | x |
| Pro. Ex. 12 | PVA(A12) | 1184 | 616 | A | 0.43 | 6.24 | D | 0.27 | 3.04 | — | — | — | 0.04 | 40 | 0.0182 | A | x |
| Pro. Ex. 13 | PVA(A13) | 1260 | 540 | A | 0.47 | 6.16 | E | 0.17 | 1.27 | — | — | — | 0.05 | 40 | 0.0020 | A | x |
| Pro. Ex. 14 | PVA(A14) | 945 | 855 | A | 0.58 | 10.25 | A | 0.91 | 5.49 | — | — | — | 0.1 | 49 | 0.0103 | A | x |
| Pro. Ex. 15 | PVA(A15) | 1440 | 360 | A | 0.29 | 3.99 | A | 1.39 | 4.67 | — | — | — | 0.02 | 33.5 | 0.0097 | A | x |
| Pro. Ex. 16 | PVA(A16) | 1476 | 324 | A | 0.26 | 1.71 | A | 1.43 | 2.50 | — | — | — | 0.01 | 17.5 | 0.0098 | A | x |
| Pro. Ex. 17 | PVA(A17) | 1476 | 324 | A | 0.43 | 2.66 | A | 1.43 | 1.72 | — | — | — | 0.005 | 12 | 0.0098 | A | x |
| Pro. Ex. 18 | PVA(A18) | 630 | 1170 | A | 0.17 | 1.14 | A | 0.61 | 1.22 | — | — | — | 0.04 | 20 | 0.0098 | A | x |
| Pro. Ex. 19 | PVA(A19) | 540 | 1260 | A | 0.12 | 1.18 | A | 0.52 | 1.83 | — | — | — | 0.1 | 35 | 0.0102 | A | x |
| Pro. Ex. 20 | PVA(A20) | 1210 | 590 | A | 0.45 | 6.43 | A | 1.17 | 4.43 | F | 70 | — | 0.05 | 40 | 0.0100 | A | x |
| Pro. Ex. 21 | PVA(A21) | 1197 | 603 | A | 0.44 | 6.36 | A | 1.16 | 4.63 | — | — | — | 0.05 | 40 | 0.0101 | A | x |
| Pro. Ex. 22 | PVA(A22) | 1197 | 603 | A | 0.44 | 6.36 | A | 1.16 | 4.63 | — | — | — | 0.05 | 40 | 0.0160 | A | o |
| Pro. Ex. 23 | PVA(A23) | 1296 | 504 | B | 0.29 | 4.04 | B | 0.06 | 3.10 | C | 0.11 | 1.51 | 0.05 | 40 | 0.0180 | B | x |
| Pro. Ex. 24 | PVA(I) | 1197 | 603 | A | 0.44 | 6.36 | A | 1.16 | 4.63 | — | — | — | 0.05 | 40 | 0.0117 | A | x |
| Pro. Ex. 25 | PVA(II) | 1197 | 603 | A | 0.44 | 6.36 | A | 1.16 | 4.63 | — | — | — | 0.05 | 40 | 0.0088 | A | x |
| Pro. Ex. 26 | PVA(III) | 1188 | 612 | E | 0.16 | 2.38 | A | 1.15 | 4.60 | — | — | — | 0.05 | 40 | 0.0100 | A | x |
| Pro. Ex. 27 | PVA(IV) | — | — | F | — | — | A | — | — | — | — | — | — | — | — | — | x |
| Pro. Ex. 28 | PVA(V) | 900 | 900 | A | 0.42 | 11.46 | A | 0.87 | 6.97 | — | — | — | 0.3 | 80 | 0.0102 | A | x |
| Pro. Ex. 29 | PVA(VI) | 1494 | 306 | A | 0.19 | 0.73 | A | 1.23 | 1.24 | — | — | — | 0.005 | 10 | 0.0103 | A | x |
| Pro. Ex. 30 | PVA(VII) | 396 | 1404 | — | — | — | A | 0.38 | 1.21 | F | 95 | — | 0.15 | 40 | 0.0101 | A | x |
| Pro. Ex. 31 | PVA(VIII) | 1260 | 540 | A | 0.34 | 4.97 | — | — | — | — | — | — | 0.06 | 40 | 0.0012 | A | x |
| Pro. Ex. 32 | PVA(IX) | 360 | 1440 | — | — | — | A | 0.40 | 1.60 | G | 500 | — | 0.25 | 40 | 0.0101 | A | x |
| Pro. Ex. 33 | PVA(X) | 1188 | 612 | A | 0.44 | 6.42 | A | 0.44 | — | — | — | — | 0.03 | 40 | 0.0018 | A | x |
| Pro. Ex. 34 | PVA(XI) | 1233 | 567 | A | 0.46 | 6.54 | H | 1.92 | 8.15 | — | — | — | 0.05 | 40 | 0.0100 | A | x |
| Pro. Ex. 35 | PVA(XII) | 360 | 1440 | — | — | — | — | — | — | — | — | — | 0.2 | 40 | 0.0018 | A | x |

TABLE 2

Values of physical properties of polyvinyl alcohol polymer (A)

| | PVA | Degree of polymerization | Degree of saponification (mol %) | Degree of modification of unsaturated monomer 1 (mol %) | Degree of modification of unsaturated monomer 2 (mol %) | Block character | Value of formula (1) | Water solubility |
|---|---|---|---|---|---|---|---|---|
| Pro. Ex. 1 | PVA(A1) | 250 | 45 | 0.7 | — | 0.449 | 76 | A |
| Pro. Ex. 2 | PVA(A2) | 250 | 57 | 0.7 | — | 0.445 | 76 | A |
| Pro. Ex. 3 | PVA(A3) | 250 | 40 | 0.7 | — | 0.434 | 76 | A |
| Pro. Ex. 4 | PVA(A4) | 250 | 29 | 0.7 | — | 0.442 | 76 | A |
| Pro. Ex. 5 | PVA(A5) | 230 | 38 | 0.7 | — | 0.453 | 75 | A |
| Pro. Ex. 6 | PVA(A6) | 280 | 42 | 0.7 | — | 0.441 | 71 | A |
| Pro. Ex. 7 | PVA(A7) | 270 | 42 | 0.7 | — | 0.451 | 76 | A |
| Pro. Ex. 8 | PVA(A8) | 250 | 46 | 0.3 | — | 0.456 | 77 | A |
| Pro. Ex. 9 | PVA(A9) | 300 | 46 | 2.1 | — | 0.469 | 76 | A |
| Pro. Ex. 10 | PVA(A10) | 260 | 42 | 0.7 | — | 0.444 | 77 | A |
| Pro. Ex. 11 | PVA(A11) | 250 | 45 | 0.4 | — | 0.450 | 76 | A |
| Pro. Ex. 12 | PVA(A12) | 250 | 41 | 0.4 | — | 0.448 | 76 | A |
| Pro. Ex. 13 | PVA(A13) | 260 | 41 | 0.1 | — | 0.450 | 77 | A |
| Pro. Ex. 14 | PVA(A14) | 150 | 45 | 0.7 | — | 0.455 | 78 | A |
| Pro. Ex. 15 | PVA(A15) | 380 | 41 | 0.8 | — | 0.441 | 74 | A |
| Pro. Ex. 16 | PVA(A16) | 510 | 44 | 0.7 | — | 0.449 | 77 | A |
| Pro. Ex. 17 | PVA(A17) | 260 | 40 | 0.7 | — | 0.433 | 88 | A |
| Pro. Ex. 18 | PVA(A18) | 240 | 40 | 0.6 | — | 0.431 | 55 | A |
| Pro. Ex. 19 | PVA(A19) | 250 | 44 | 0.7 | — | 0.451 | 41 | A |
| Pro. Ex. 20 | PVA(A20) | 260 | 45 | 0.7 | 0.2 | 0.467 | 74 | A |
| Pro. Ex. 21 | PVA(A21) | 250 | 45 | 0.7 | — | 0.533 | 76 | A |
| Pro. Ex. 22 | PVA(A22) | 250 | 44 | 0.7 | — | 0.736 | 76 | A |
| Pro. Ex. 23 | PVA(A23) | 300 | 40 | 0.6 | 0.2 | 0.439 | 77 | A |
| Pro. Ex. 24 | PVA(I) | 250 | 69 | 0.7 | — | 0.444 | 76 | A |
| Pro. Ex. 25 | PVA(II) | 250 | 15 | 0.7 | — | 0.456 | 76 | B |
| Pro. Ex. 26 | PVA(III) | 250 | 47 | 0.7 | — | 0.444 | 76 | A |
| Pro. Ex. 27 | PVA(IV) | — | — | — | — | — | — | — |
| Pro. Ex. 28 | PVA(V) | 80 | 44 | 0.7 | — | 0.442 | 79 | A |
| Pro. Ex. 29 | PVA(VI) | 720 | 52 | 0.6 | — | 0.441 | 72 | A |
| Pro. Ex. 30 | PVA(VII) | 270 | 43 | 0.7 | 1.2 | 0.468 | 72 | A |
| Pro. Ex. 31 | PVA(VIII) | 250 | 42 | 0.7 | 2.1 | 0.468 | 71 | B |
| Pro. Ex. 32 | PVA(IX) | 230 | 46 | 0.8 | — | 0.441 | — | A |
| Pro. Ex. 33 | PVA(X) | 260 | 46 | — | — | 0.440 | 79 | B |
| Pro. Ex. 34 | PVA(XI) | 210 | 42 | 0.7 | — | 0.455 | 76 | B |
| Pro. Ex. 35 | PVA(II) | 240 | 45 | — | — | 0.448 | — | B |

TABLE 3

| Type | Chain transfer agent | Carbon number |
|---|---|---|
| A | n-dodecanethiol | 12 |
| B | n-octanethiol | 8 |
| C | n-octadecanethiol | 18 |
| D | t-dodecanethiol | 12 |
| E | n-butanethiol | 4 |
| F | n-docosanethiol | 22 |

TABLE 4

| Type | Unsaturated monomer |
|---|---|
| A | Monomethyl maleate |
| B | Methacrylic acid |
| C | Itaconic acid |
| D | Fumaric acid |
| E | 2-acrylamide-2-methylpropane sulfonic acid Na |
| F | Polyoxypropylene allyl ether (n = 28) |
| G | Polyoxyethylene allyl ether (n = 33) |
| H | 3-(methacryloylamino)propyltrimethyl ammonium chloride |

TABLE 5

| Type | Catalyst used | PVAc concentration (%) | Saponification system temperature (° C.) | Saponification system water content (%) |
|---|---|---|---|---|
| A | Sodium hydroxide | 30 | 40 | 1 |
| B | p-toluenesulfonic acid | 30 | 65 | 0.5 |

Example 1

Into a 5-liter autoclave was charged PVA(B) having a viscosity average degree of polymerization of 2400 and a degree of saponification of 80 mol % in the form of 100 parts of a deionized aqueous solution to give a concentration of 1000 ppm with respect to vinyl chloride monomers. The above-mentioned PVA(A1) was also charged in the form of 100 parts of a deionized aqueous solution to give a concentration of 400 ppm with respect to vinyl chloride monomers. When charging, deionized water was added so that the total amount of deionized water was 1200 parts. Next, 1.07 parts of a 70% toluene solution of di(2-ethylhexyl) peroxydicarbonate was charged into the autoclave. Nitrogen was introduced into the autoclave so that the pressure in the autoclave was kept at 0.2 MPa and then the introduced nitrogen was purged. This introducing and purging operation was repeated five times to completely replace the air in the autoclave with nitrogen to remove oxygen therefrom, and then 940 parts of vinyl chloride was charged in the autoclave, and the contents of the autoclave were heated to 65° C. with stirring to initiate polymerization of the vinyl chloride monomers. At the start of the polymerization, the pressure in the autoclave was 1.05 MPa. When the pressure in the autoclave reached 0.70 MPa about three hours after the start of the polymerization, the polymerization was stopped. Unreacted vinyl chloride monomers were removed, and polymerization products were recovered and dried at 65° C. for 16 hours. Thus, vinyl chloride polymer particles were obtained.

(Evaluation of Vinyl Chloride Polymer Particles)

For the vinyl chloride polymer particles obtained in Example 1, (1) the average particle diameter, (2) the particle size distribution, (3) the plasticizer absorptivity, and (4) the monomer removability were evaluated by the following methods. Table 6 shows the evaluation results.

(1) Average Particle Diameter

The average particle diameter of the vinyl chloride polymer particles was determined with particle size distribution measured by dry sieving using a metal mesh sieve having a Tyler mesh size.

(2) Particle Size Distribution

The content of particles retained on a JIS standard 42-mesh sieve was indicated in mass %.
A: less than 0.5%
B: 0.5% or more and less than 1%
C: 1% or more The content of particles retained on a JIS standard 60-mesh sieve was indicated in mass %.
A: less than 5%
B: 5% or more and less than 10%
C: 10% or more It is indicated that the lower the content of particles retained on a 42-mesh sieve or a 60-mesh sieve is, the smaller the number of coarse particles formed is and the narrower the particle size distribution is, and thus the higher the polymerization stability is.

(3) Plasticizer Absorptivity

The mass (A g) of a 5 mL syringe filled with 0.02 g of absorbent cotton was measured, 0.5 g of vinyl chloride polymer particles was added to the syringe and the mass (B g) of the resulting syringe was measured. Then, 1 g of dioctyl phthalate (DOP) was added to the syringe, and the resulting syringe was allowed to stand for 15 minutes. Then, the syringe was centrifuged at 3000 rpm for 40 minutes and the mass (C g) of the resulting syringe was measured. The plasticizer absorptivity (%) was determined from the following calculation formula:

$$\text{Plasticizer absorptivity (\%)}=100\times[\{(C-A)/(B-A)\}-1]$$

(4) Monomer Removability (Residual Monomer Content)

A polymerization product obtained in the suspension polymerization of vinyl chloride was recovered and then dried at 75° C. for 1 hour and for 3 hours, respectively. The amounts of residual monomers after the 1-hour drying and the 3-hour drying were measured by headspace gas chromatography to determine the residual monomer content from the following formula: (amount of residual monomers after 3-hour drying/amount of residual monomers after 1-hour drying)×100. A lower residual monomer content means that the ratio of the amount of residual monomers removed by drying for 2 hours between the 1-hour drying and the 3-hour drying to the total amount of residual monomers in the vinyl chloride polymer particles is higher. Therefore, the value of the residual monomer content is a measure of the ease of removing residual monomers, that is, the monomer removability.

Examples 2 to 23

Suspension polymerization of vinyl chloride was conducted in the same manner as in Example 1 except that PVA(A2) to PVA(A23) were used, so as to obtain vinyl chloride polymer particles. Table 6 shows the evaluation results of the vinyl chloride polymer particles.

Example 24

Suspension polymerization of vinyl chloride was conducted in the same manner as in Example 1, except that a total 1640 parts of deionized water was charged, so as to obtain vinyl chloride polymer particles. Table 7 shows the evaluation results of the polymer particles thus obtained.

Comparative Example 1

Suspension polymerization of vinyl chloride was conducted in the same manner as in Example 1, except that PVA(A1) was not used. Table 6 shows the evaluation results of the vinyl chloride polymer particles. In this case, the plasticizer absorptivity and monomer removability of the vinyl chloride polymer particles thus obtained were not high enough.

Comparative Example 2

Suspension polymerization of vinyl chloride was conducted in the same manner as in Example 1, except that PVA(I) having a degree of saponification of 69 mol % was used instead of PVA(A1). Table 6 shows the evaluation results of the vinyl chloride polymer particles. In this case, the plasticizer absorptivity and monomer removability of the vinyl chloride polymer particles thus obtained were not high enough, and many of the vinyl chloride polymer particles were retained on a 42-mesh sieve and thus the polymerization was unstable.

Comparative Example 3

PVA(II) having a degree of saponification of 15 mol % was used instead of PVA(A1). However, PVA(II) was not dissolved or dispersed in water probably due to too low degree of saponification of PVA(II), and thus evaluation could not be performed.

Comparative Example 4

Suspension polymerization of vinyl chloride was conducted in the same manner as in Example 1, except that PVA(III) synthesized using n-butanethiol as a chain transfer agent was used instead of PVA(A1). Table 6 shows the evaluation results of the vinyl chloride polymer particles. In this case, the plasticizer absorptivity and monomer removability of the vinyl chloride polymer particles thus obtained were not high enough.

Comparative Example 5

Suspension polymerization of vinyl chloride was conducted in the same manner as in Example 1, except that PVA(V) having a viscosity average degree of polymerization of 80 was used instead of PVA(A1). Table 6 shows the evaluation results of the vinyl chloride polymer particles. In this case, the plasticizer absorptivity and monomer removability of the vinyl chloride polymer particles thus obtained were good. However, the vinyl chloride polymer particles were very coarse and a large proportion of the vinyl chloride polymer particles were retained on a 42-mesh sieve and a 60-mesh sieve, resulting in poor polymerization stability.

Comparative Example 6

Suspension polymerization of vinyl chloride was conducted in the same manner as in Example 1, except that PVA(VI) having a viscosity average degree of polymerization of 720 was used instead of PVA(A1). Table 6 shows the evaluation results of the vinyl chloride polymer particles. In this case, the plasticizer absorptivity and monomer removability of the vinyl chloride polymer particles thus obtained were not high enough.

Comparative Example 7

Suspension polymerization of vinyl chloride was conducted in the same manner as in Example 1, except that PVA(VII) having no aliphatic hydrocarbon group at its terminal but having an anionic group and a polyoxypropylene group in its side chain was used instead of PVA(A1). Table 6 shows the evaluation results of the vinyl chloride polymer particles. In this case, the plasticizer absorptivity and monomer removability of the vinyl chloride polymer particles thus obtained were good. However, the vinyl chloride polymer particles were very coarse and a large proportion of the vinyl chloride polymer particles were retained on a 42-mesh sieve and a 60-mesh sieve, resulting in poor polymerization stability.

Comparative Example 8

PVA(VIII) having no anionic group in its side chain, having an aliphatic hydrocarbon group at its terminal, and having a polyoxyethylene group as a hydrophilic group in its side chain was used instead of PVA(A1). However, PVA (VIII) was not dissolved or dispersed in water due to its insufficient hydrophilicity, and thus evaluation could not be performed.

Comparative Example 9

Suspension polymerization of vinyl chloride was conducted in the same manner as in Example 1, except that PVA(IX) having no aliphatic hydrocarbon group at its terminal was used instead of PVA(A1). Table 6 shows the evaluation results of the vinyl chloride polymer particles. In this case, the plasticizer absorptivity and monomer removability of the vinyl chloride polymer particles thus obtained were not high enough. In addition, the vinyl chloride polymer particles were coarse and a large proportion of the vinyl chloride polymer particles were retained on a 42-mesh sieve and a 60-mesh sieve, resulting in poor polymerization stability.

Comparative Example 10

PVA(X) having no anionic group in its side chain was used instead of PVA(A1). However, PVA(X) was not dissolved or dispersed in water due to its insufficient hydrophilicity, and thus evaluation could not be performed.

Comparative Example 11

PVA(XI) having a cationic group in its side chain was used instead of PVA(A1). However, PVA(XI) was not dissolved or dispersed in water due to its insufficient hydrophilicity, and thus evaluation could not be performed.

Comparative Example 12

Unmodified PVA(XII) was used instead of PVA(A1). However, PVA(XII) was not dissolved or dispersed in water due to its insufficient hydrophilicity, and thus evaluation could not be performed.

Comparative Example 13

Suspension polymerization of vinyl chloride was conducted in the same manner as in Comparative Example 9, except that a total 1640 parts of deionized water was charged, so as to obtain vinyl chloride polymer particles. Table 7 shows the evaluation results of the polymer particles thus obtained. In this case, the plasticizer absorptivity and monomer removability of the vinyl chloride polymer particles thus obtained were not high enough. In addition, the vinyl chloride polymer particles were coarse, and a large proportion of the vinyl chloride polymer particles were retained on a 42-mesh sieve and a 60-mesh sieve, resulting in poor polymerization stability. Examples 1 and 24 were compared to Comparative Examples 9 and 13 in Table 7. This comparison shows that the use of the dispersion stabilizer for suspension polymerization of the present invention prevents formation of coarse vinyl chloride polymer particles and allows the polymerization to proceed stably even under the polymerization conditions where the ratio of vinyl chloride to water is high.

TABLE 6

| | | | Evaluation results of vinyl chloride polymer particles | | | | |
|---|---|---|---|---|---|---|---|
| | PVA | Water solubility of PVA | Average particle diameter (μm) | Particle size distribution | | Plasticizer absorptivity (%) | Residual monomer content (%) |
| | | | | 42-mesh on | 60-mesh on | | |
| Ex. 1 | PVA(A1) | A | 132.5 | A | A | 19.2 | 3.7 |
| Ex. 2 | PVA(A2) | A | 145.0 | A | A | 18.4 | 7.5 |
| Ex. 3 | PVA(A3) | A | 129.9 | A | A | 19.4 | 3.4 |
| Ex. 4 | PVA(A4) | A | 139.5 | A | A | 18.5 | 6.2 |
| Ex. 5 | PVA(A5) | A | 132.1 | A | A | 19.5 | 3.3 |
| Ex. 6 | PVA(A6) | A | 134.4 | A | A | 19.0 | 4.1 |
| Ex. 7 | PVA(A7) | A | 135.2 | A | A | 19.6 | 3.2 |
| Ex. 8 | PVA(A8) | A | 129.0 | A | A | 19.2 | 3.2 |
| Ex. 9 | PVA(A9) | A | 152.4 | A | A | 19.9 | 3.5 |
| Ex. 10 | PVA(A10) | A | 132.8 | A | A | 20.0 | 2.8 |

TABLE 6-continued

| | PVA | Water solubility of PVA | Average particle diameter (μm) | Particle size distribution 42-mesh on | Particle size distribution 60-mesh on | Plasticizer absorptivity (%) | Residual monomer content (%) |
|---|---|---|---|---|---|---|---|
| Ex. 11 | PVA(A11) | A | 134.5 | A | A | 19.1 | 4.3 |
| Ex. 12 | PVA(A12) | A | 140.4 | A | A | 19.4 | 4.1 |
| Ex. 13 | PVA(A13) | A | 156.9 | A | A | 19.4 | 4.0 |
| Ex. 14 | PVA(A14) | A | 142.2 | A | A | 19.6 | 3.3 |
| Ex. 15 | PVA(A15) | A | 130.3 | A | A | 18.9 | 4.0 |
| Ex. 16 | PVA(A16) | A | 130.1 | A | A | 18.5 | 5.5 |
| Ex. 17 | PVA(A17) | A | 127.8 | A | A | 19.5 | 2.8 |
| Ex. 18 | PVA(A18) | A | 146.9 | A | A | 18.4 | 7.5 |
| Ex. 19 | PVA(A19) | A | 137.4 | A | A | 18.4 | 9.0 |
| Ex. 20 | PVA(A20) | A | 168.2 | A | B | 19.7 | 4.1 |
| Ex. 21 | PVA(A21) | A | 130.4 | A | A | 18.9 | 4.5 |
| Ex. 22 | PVA(A22) | A | 145.3 | A | A | 18.4 | 8.5 |
| Ex. 23 | PVA(A23) | A | 148.6 | A | A | 20.1 | 2.5 |
| Com. Ex. 1 | — | — | 145.0 | B | A | 7.0 | 33.8 |
| Com. Ex. 2 | PVA(I) | A | 150.1 | C | A | 11.9 | 25.8 |
| Com. Ex. 3 | PVA(II) | B | — | — | — | — | — |
| Com. Ex. 4 | PVA(III) | A | 136.8 | A | A | 15.9 | 17.9 |
| Com. Ex. 5 | PVA(V) | A | 271.6 | C | C | 19.0 | 8.0 |
| Com. Ex. 6 | PVA(VI) | A | 120.5 | A | A | 16.0 | 16.8 |
| Com. Ex. 7 | PVA(VII) | A | 341.4 | C | C | 19.9 | 5.9 |
| Com. Ex. 8 | PVA(VIII) | B | — | — | — | — | — |
| Com. Ex. 9 | PVA(IX) | A | 184.5 | C | C | 17.7 | 13.0 |
| Com. Ex. 10 | PVA(X) | B | — | — | — | — | — |
| Com. Ex. 11 | PVA(XI) | B | — | — | — | — | — |
| Com. Ex. 12 | PVA(XII) | B | — | — | — | — | — |

TABLE 7

| | PVA | Vinyl chloride monomer/water | Average particle diameter (μm) | Particle size distribution 42-mesh on | Particle size distribution 60-mesh on | Plasticizer absorptivity (%) | Residual monomer content (%) |
|---|---|---|---|---|---|---|---|
| Ex. 1 | PVA(A1) | 940/1200 | 132.5 | A | A | 19.2 | 3.7 |
| Ex. 24 | PVA(A1) | 940/1640 | 120.3 | A | A | 18.8 | 3.5 |
| Com. Ex. 9 | PVA(IX) | 940/1200 | 184.5 | C | C | 17.7 | 13.0 |
| Com. Ex. 13 | PVA(IX) | 940/1640 | 162.6 | B | B | 17.3 | 12.8 |

The dispersion stabilizer for suspension polymerization of the present invention is a dispersion stabilizer for suspension polymerization of a vinyl compound, containing a polyvinyl alcohol polymer (A) having a degree of saponification of 20 mol % or more and less than 65 mol %, a viscosity average degree of polymerization (P) of 100 or more and less than 600, an aliphatic hydrocarbon group having 6 to 18 carbon atoms at its terminal, and an anionic group in its side chain. As shown in Examples above, when this dispersion stabilizer for suspension polymerization of the present invention is used for suspension polymerization of a vinyl compound, fewer coarse particles are formed due to high polymerization stability, and the resulting particles have a uniform particle size. In addition, polymer particles having high plasticizer absorptivity can be obtained. In particular, this dispersion stabilizer is very effective in terms of monomer removability, and thus polymer particles having high residual monomer removal efficiency can be obtained. Furthermore, it is possible to prepare a solution or a dispersion of this dispersion stabilizer using water without any organic solvent such as methanol, and thus it has very high handleability and it is less environmentally harmful. Therefore, the dispersion stabilizer for suspension polymerization of the present invention is very useful for industrial applications.

INDUSTRIAL APPLICABILITY

The present invention is useful in producing various vinyl resins (in particular, vinyl chloride resins) by suspension polymerization.

The invention claimed is:

1. A dispersion stabilizer, comprising a vinyl alcohol polymer (A) having a degree of saponification of 20 mol % or more and 57 mol % or less, a viscosity average degree of polymerization (P) of 100 or more and less than 600, an aliphatic hydrocarbon group having 6 to 18 carbon atoms at its terminal, and an anionic group in its side chain, wherein the viscosity average degree of polymerization (P) is calculated using the following Nakajima's equation $$[\eta]_{acetone,\ 30°\ C.} = 7.94 \times 10^{-4} \cdot P^{0.62}$$

wherein
the relationship between the viscosity average degree of polymerization (P) of the vinyl alcohol polymer (A) and the degree of modification (S) (mol %) of the aliphatic hydrocarbon group satisfies the following formula (1)

$$50 \leq S \times P/1.880 < 100 \tag{1}.$$

2. The dispersion stabilizer according to claim 1, wherein in sequences of vinyl ester monomer units and/or vinyl alcohol units of the vinyl alcohol polymer (A), a block character of the vinyl ester monomer units is 0.6 or less, wherein the block character is determined by $^{13}$C-NMR spectroscopy.

3. The dispersion stabilizer according to claim 1, further comprising a vinyl alcohol polymer (B) having a degree of saponification of 65 mol % or more and 95 mol % or less and a viscosity average degree of polymerization of 600 or more and 8000 or less, wherein the viscosity average degree of polymerization is calculated using the following Nakajima's equation $$[\eta]_{acetone,\ 30°\ C.} = 7.94 \times 10^{-4} \cdot P^{0.62}.$$

4. The dispersion stabilizer according to claim 3, wherein a mass ratio between the vinyl alcohol polymer (A) and the vinyl alcohol polymer (B) ([vinyl alcohol polymer (A)]/[vinyl alcohol polymer (B)]) is in the range of 10/90 to 55/45.

5. A method for producing a vinyl resin, comprising conducting suspension polymerization of a vinyl compound in the presence of the dispersion stabilizer according to claim 1.

6. The method according to claim 5, wherein the suspension polymerization is conducted in the presence of water, and the mass ratio between the vinyl compound and the water ([vinyl compound]/[water]) is more than 3/4 and less than 10/9.

* * * * *